(12) United States Patent
Jenkins

(10) Patent No.: US 7,624,700 B2
(45) Date of Patent: Dec. 1, 2009

(54) SPOILAGE REDUCING COMPOSITION FOR BIRD FEEDERS

(75) Inventor: Dennis B. Jenkins, 640 Rutherford Cir., Brentwood, CA (US) 94513

(73) Assignee: Dennis B. Jenkins, Brentwood, CA (US)

( * ) Notice: Subject to any disclaimer, the term of this patent is extended or adjusted under 35 U.S.C. 154(b) by 0 days.

(21) Appl. No.: 12/214,676

(22) Filed: Jun. 20, 2008

(65) Prior Publication Data

US 2008/0271677 A1     Nov. 6, 2008

Related U.S. Application Data

(62) Division of application No. 10/950,140, filed on Sep. 25, 2004, now Pat. No. 7,389,742.

(51) Int. Cl.
*A01K 29/00* (2006.01)

(52) U.S. Cl. .................................... 119/51.01

(58) Field of Classification Search .............. 119/51.01, 119/52.1, 53, 174
See application file for complete search history.

(56) References Cited

U.S. PATENT DOCUMENTS

| | | | | | |
|---|---|---|---|---|---|
| 3,216,620 | A | * | 11/1965 | Laughlin | 222/83 |
| 5,328,082 | A | * | 7/1994 | Fritz et al. | 229/122.1 |
| 5,503,931 | A | * | 4/1996 | Goodman, Sr. | 428/402 |
| 6,691,640 | B1 | * | 2/2004 | Huckabee | 119/51.01 |

* cited by examiner

*Primary Examiner*—Thomas Price

(57) ABSTRACT

Disclosed is a method, composition and kit for preventing spoilage of feed in a bird feeder by use of a spoilage reducing composition that comprises an effective amount of a moisture absorbing material, an optional support material, and an optional functional additive that are formed into a shaped body that is combined with an bird feeder, bird feed and/or bird seed to effectively absorb water and water vapor thereby reducing spoilage of feed.

7 Claims, No Drawings

SPOILAGE REDUCING COMPOSITION FOR BIRD FEEDERS

CROSS-REFERENCE TO RELATED APPLICATIONS

This application is a divisional application of currently pending U.S. patent application Ser. No. 10/950,140, filed Sep. 25, 2004 now U.S. Pat. No. 7,389,742, the disclosure of which is incorporated herein by reference.

BACKGROUND OF THE INVENTION

1. Field of the Invention

The present invention relates to a method, composition and kit for preventing spoilage of feed in a bird feeder by use of a spoilage reducing composition that comprises an effective amount of a moisture absorbing material, an optional support material, and an optional functional additive. The present invention also relates to methods and kits employing spoilage reducing compositions employed in the form of a shaped body, optionally a plurality of shaped bodies, optionally packaged in an outer packaging material and combined with a bird feeder, bird feed and/or plurality of bird seed to effectively absorb water and water vapor thereby reducing spoilage of feed in a bird feeder. The present invention also relates to a kit for preventing spoilage of bird feed with instructions for combining the spoilage reducing compositions with bird feeders, bird feed and/or a plurality of bird seed.

2. Background of the Related Art

Many different types and designs of bird feeders have been developed. Examples of several designs of bird feeders include those described by Kilham, U.S. Pat. No. 3,568,641; Leal, U.S. Pat. No. 407,863; Des. U.S. Pat. No. 231,369; Clarke, U.S. Pat. No. 4,259,927; McNeely, U.S. Pat. No. 444,598; Kuelbs, U.S. Pat. No. 471,327; Coffer, U.S. Pat. No. 4,940,019; Washam, U.S. Pat. No. 5,410,986; and Bloedorn, U.S. Pat. No. 5,924,381, all of which are hereby incorporated by reference.

These feeders however are prone to water and moisture intrusion, commonly due to rain, leaks, condensation and/or ambient humidity resulting from environmental exposure. Spoiling of feed and the generation of mold due to moisture and/or humidity in an animal feeder is a serious problem, and is particularly common to many bird feeders owing to the nature of the bird seed employed combined with environment exposure. Spoiled feed fusing to the feeder is also a common problem for the bird hobbyist, requiring frequent changing of the feed. Further, moisture-related feed spoilage can cause additional problems, including bird rejection of the feed, birds ingesting mold toxins from the spoiled feed, sprouting of bird seed, and feed fusing to the feeder causing cleaning problems.

Harmful mold toxins generated by spoilage are a critical problem affecting the health of the wild birds. Some of the most toxic compounds on earth are created by molds, for example, but not limited to mycotoxins. Even trace amounts of these mycotoxins can cause harmful or lethal effects to birds. One example is Aflatoxin, which is a particularly harmful by-product of *Aspergillus parasititicus* mold that commonly grows on grain. Amounts of this toxin as low as 0.1 micrograms can be lethal to many small birds. The more that seeds are exposed to moisture, the greater potential for Aflatoxin production.

Spoiled feed fusing to the feeder is a common problem for the bird hobbyist, prompting cleaning of the feeder and replacement of fouled feed. Moisture and spoilage is particularly a problem at the bottom, low or no-flow zones, dead-end areas, and areas within the feeder close to openings and/or exposed directly to the environment. High quality hulled and "no mess" feed are especially susceptible to spoiling, and commonly cause blocked feeder holes, agglomeration of seed, and subsequent loss of expensive seed. It is necessary for the feeder operator to frequently clean the feeder by removing feeder contents and washing the feeder due to these problems. Often a cleaning disinfectant needs to be used if food spoilage has occurred in order to remove residual molds and mold toxins and other decay byproducts.

Further, even if mold spoilage does not occur, humidity can accelerate aging of the seed, rancidity, and reduction in the quality of the seed, all resulting in potential bird rejection of the seed.

Many bird feeders have been designed to make it easier to clean the feeder after the feed has spoiled, but this is a belated solution. Cleaning a bird feeder that has moldy or caked-on seed is a messy and time-consuming task. Microbial inhibitors can be added to the seed and feeder, but this approach creates health risk issues for the birds, as many common microbial inhibitors are effective only at levels that are toxic to animals and birds when ingested.

What is needed is preventative method employing a spoilage reducing composition that prevents spoilage of feed in a bird feeder.

SUMMARY OF THE INVENTION

The present invention relates to a spoilage preventing method, spoilage reducing composition and kit for eliminating the spoilage and molding problems of feed associated with outdoor bird feeders.

One embodiment of the present invention is a method employing a spoilage reducing composition that is combined with a bird feeder, bird feed and/or a plurality of seed. The spoilage reducing compositions of the present invention comprise a moisture absorbing material, optionally, a support material, optionally a functional additive, and optionally further adjuncts.

One embodiment of the present invention is a method whereby a spoilage reducing composition is used as an additive to a bird feeder containing bird feed.

One embodiment of the present invention is a method whereby a spoilage reducing composition is combined with bird feed and added to a bird feeder.

One embodiment of the present invention is a method whereby a spoilage reducing composition is combined with a bird feeder, which is then used for dispensing bird feed.

One embodiment of the present invention is a method whereby a spoilage reducing composition is combined with both bird feed and a bird feeder.

One embodiment of the present invention is a method for preventing spoilage of feed in a bird feeder wherein the spoilage reducing composition comprises an effective amount of moisture absorbing material.

One embodiment of the present invention is a method for preventing spoilage of feed in a bird feeder wherein the spoilage reducing composition comprises an effective amount of moisture absorbing material and a support material.

One embodiment of the present invention is a method for preventing spoilage of feed in a bird feeder wherein the spoilage reducing composition comprises an effective amount of moisture absorbing material and a functional additive.

One embodiment of the present invention is a method for preventing spoilage of feed in a bird feeder wherein the spoilage reducing composition comprises an effective amount of moisture absorbing material, a support material, and a functional additive.

One embodiment of the present invention is a method for preventing spoilage of feed in a bird feeder wherein the moisture absorbing material of the spoilage reducing composition comprises a silica gel.

One embodiment of the present invention is a method for preventing spoilage of feed in a bird feeder wherein the moisture absorbing material of the spoilage reducing composition comprises silica in the form of silicon dioxide and/or hydrated silicon dioxide.

One embodiment of the present invention is a method for preventing spoilage of feed in a bird feeder wherein the moisture absorbing material of the spoilage reducing composition comprises silica selected from the group consisting of silica gel, precipitated silica, amorphous silica, colloidal silica, pyrogenic silica, fumed silica, silica aerogel, and mixtures thereof.

One embodiment of the present invention is a method for preventing spoilage of feed in a bird feeder wherein the moisture absorbing material of the spoilage reducing composition comprises an alumina, aluminum oxide and/or hydrated aluminum oxide.

One embodiment of the present invention is a method for preventing spoilage of feed in a bird feeder wherein the moisture absorbing material of the spoilage reducing composition comprises an alumina selected from the group consisting of amorphous alumina, activated alumina, activated bauxite, gibbsite, bauxite, boehmite, pseudoboehmite, and mixtures thereof.

One embodiment of the present invention is a method for preventing spoilage of feed in a bird feeder wherein the moisture absorbing material of the spoilage reducing composition comprises an absorbent mineral selected from the group consisting of natural zeolite, synthetic zeolite, perlite, expanded perlite, volcanic ash, pumice, tobermite, tuft, attapulgite, sepiolite, montmorillonite, smectite, bentonite, kaolinite, halloysite, hectorite, dicalcium silicate, clay, activated clay, Fuller's earth, vermicullite, gypsum, shale, bassanite, diatomaceous earth, diatomite, and mixtures thereof.

One embodiment of the present invention is a method for preventing spoilage of feed in a bird feeder wherein the moisture absorbing material of the spoilage reducing composition comprises a nanomaterial selected from the group consisting of silica, hydrated silica, alumina, hydrated alumina, titania, and mixtures thereof.

One embodiment of the present invention is a method for preventing spoilage of feed in a bird feeder wherein the moisture absorbing material of the spoilage reducing composition comprises a material capable of absorbing at least 30 percent by weight of water in the form of liquid water, water vapor, and combinations thereof.

One embodiment of the present invention is a method for preventing spoilage of feed in a bird feeder wherein the support material of the spoilage reducing composition is selected from the group consisting of plaster of paris, paper, cellulosic webs, polymeric fibrous webs, glass, plastic, wood, metal, minerals, ceramic, wood chips, alfalfa, bark, straw, synthetic foams, recycled materials, grain, seed, sand, agricultural by-products, corn cobs, nut shells, activated carbon, absorbent polymers, polyacrylamide, modified starch, modified cellulose, and mixtures thereof.

One embodiment of the present invention is a method for preventing spoilage of feed in a bird feeder wherein the functional additive of the spoilage reducing composition is selected from the group consisting of moisture indicating agents, anti-microbial agents, anti-molding agents, colorants, odor absorbers, feed spoilage indicators, and mixtures thereof.

One embodiment of the present invention is a method for preventing spoilage of feed in a bird feeder wherein the spoilage reducing composition occurs in packets or porous containers to be placed in the bird feeder.

One embodiment of the present invention is a method for preventing spoilage of feed in a bird feeder wherein the spoilage reducing composition comprises a shaped body, wherein said shaped body comprises a form selected from the group consisting of a powder, granule, crystal, solid, gel, foam, disk, cube, cylinder, rod, ovoid, torus, sphere, donut, pyramid, prism, and combinations thereof.

One embodiment of the present invention is a method for preventing spoilage of feed in a bird feeder wherein the spoilage reducing composition comprises a shaped body, wherein said shaped body is of a size equal to or smaller than the size of said feed.

In the spoilage reducing compositions of the present invention, the moisture absorbing material serves in the capacity to absorb liquid water and/or water vapor, to reduce free moisture and humidity, thus prolonging feed freshness and reducing feed spoilage in outdoor animal feeders, including bird feeders. The present invention, in its embodiments as a spoilage reducing composition, method and kit, has the added advantage of improving the health of the feeding animals due to reduction of mold toxins in the feed.

In one embodiment of the present invention, a spoilage reducing composition containing a moisture absorbing material is used as an additive in a bird feeder. The invention further provides for the addition of a spoilage reducing composition to a bird feeder a) when the feeder is empty before adding feed (for example at the bottom of the feeder), b) simultaneously as the feed is being added to the feeder (blended with or added with the feed during addition to the feeder), and/or c) after the feed has added to the feeder (for example, on top of the feed), and any combinations of the thereof. The spoilage reducing compositions of the present invention are effective when used at the top and/or bottom of the feeder, and also when combined with the feed.

In one embodiment of the present invention, a spoilage reducing composition comprises an effective amount of moisture absorbing material.

In one embodiment of the present invention, a spoilage reducing composition comprises an effective amount of moisture absorbing material and a support material.

In one embodiment of the present invention, a spoilage reducing composition comprises an effective amount of moisture absorbing material and a functional additive.

In one embodiment of the present invention, a spoilage reducing composition comprises an effective amount of moisture absorbing material, a support material, and a functional additive.

In one embodiment of the present invention, the moisture absorbing material of the spoilage reducing composition is comprised selected from the group of materials commonly referred to as absorbents.

In one embodiment of the present invention, the moisture absorbing material of the spoilage reducing composition is comprised selected from the group of materials commonly referred to as desiccants.

In one embodiment of the present invention, the moisture absorbing material of the spoilage reducing composition is comprised of water-binding compounds.

In one embodiment of the present invention, the moisture absorbing material of the spoilage reducing composition is composed of particles between 1 mm and 2 mm.

In one embodiment of the present invention, the moisture absorbing material of the spoilage reducing composition is composed of particles between 2 mm and 8 mm.

In one embodiment of the present invention, the moisture absorbing material of the spoilage reducing composition is composed of particles between 1 mm and 8 mm.

In one embodiment of the present invention, the moisture absorbing material of the spoilage reducing composition is composed of particles between 0.001 mm and 100 mm.

In one embodiment of the present invention, the moisture absorbing material of the spoilage reducing composition comprises a silica gel.

In one embodiment of the present invention, the moisture absorbing material of the spoilage reducing composition comprises silica in the form of silicon dioxide and/or hydrated silicon dioxide.

In one embodiment of the present invention, the moisture absorbing material of the spoilage reducing composition comprises silica selected from the group consisting of silica gel, precipitated silica, amorphous silica, colloidal silica, pyrogenic silica, fumed silica, silica aerogel, and mixtures thereof.

In one embodiment of the present invention, the moisture absorbing material of the spoilage reducing composition comprises an alumina, aluminum oxide and/or hydrated aluminum oxide.

In one embodiment of the present invention, the moisture absorbing material of the spoilage reducing composition comprises an alumina selected from the group consisting of amorphous alumina, activated alumina, activated bauxite, gibbsite, bauxite, boehmite, pseudoboehmite, and mixtures thereof.

In one embodiment of the present invention, the moisture absorbing material of the spoilage reducing composition comprises an absorbent mineral selected from the group consisting of natural zeolite, synthetic zeolite, perlite, expanded perlite, volcanic ash, pumice, tobermite, tuff, attapulgite, sepiolite, montmorillonite, smectite, bentonite, kaolinite, halloysite, hectorite, dicalcium silicate, clay, activated clay, Fuller's earth, vermicullite, gypsum, shale, bassanite, diatomaceous earth, diatomite, and mixtures thereof.

In one embodiment of the present invention, the moisture absorbing material of the spoilage reducing composition comprises a nanomaterial selected from the group consisting of silica, hydrated silica, alumina, hydrated alumina, titania, and mixtures thereof.

In one embodiment of the present invention, the moisture absorbing material of the spoilage reducing composition comprises a material capable of absorbing at least 30 percent by weight of water in the form of liquid water, water vapor, and combinations thereof.

In one embodiment of the present invention, the support material of the spoilage reducing composition is selected from the group consisting of plaster of paris, paper, cellulosic webs, polymeric fibrous webs, glass, plastic, wood, metal, minerals, ceramic, wood chips, alfalfa, bark, straw, synthetic foams, recycled materials, grain, seed, sand, agricultural by-products, corn cobs, nut shells, activated carbon, absorbent polymers, polyacrylamide, modified starch, modified cellulose, and mixtures thereof.

In one embodiment of the present invention, the functional additive of the spoilage reducing composition is selected from the group consisting of moisture indicating agents, anti-microbial agents, anti-molding agents, colorants, odor absorbers, feed spoilage indicators, and mixtures thereof.

In one embodiment of the present invention, the spoilage reducing composition occurs in packets or porous containers to be placed in the bird feeder.

In one embodiment of the present invention, the spoilage reducing composition comprises a shaped body, wherein said shaped body comprises a form selected from the group consisting of a powder, granule, crystal, solid, gel, foam, disk, cube, cylinder, rod, ovoid, torus, sphere, donut, pyramid, prism, and combinations thereof.

In one embodiment of the present invention, the spoilage reducing composition comprises a shaped body of a size equal to or smaller than the size of said feed.

In one embodiment of the present invention, the spoilage reducing composition is in the form of a plurality of shaped bodies.

In one embodiment of the present invention, the spoilage reducing composition comprises a shaped body of a size between 0.001 millimeters to 1 meter.

In one embodiment of the present invention, the functional additive of the spoilage reducing composition is selected from the group consisting of moisture indicating agents, anti-microbial agents, anti-molding agents, colorants, odor absorbers, feed spoilage indicators, and mixtures thereof.

One embodiment of the present invention provides a kit for preventing spoilage of bird feed in a bird feeder.

One embodiment of the present invention provides a kit comprising i) a spoilage reducing composition comprising an effective amount of moisture absorbing material and ii) instructions for combining the spoilage reducing composition with bird feed.

One embodiment of the present invention provides a kit comprising: (i) a spoilage reducing composition comprising: (a) an effective amount of a moisture absorbing material; and (b) a support material; and (ii) instructions for combining the spoilage reducing composition with bird feed.

One embodiment of the present invention provides a kit comprising: (i) a spoilage reducing composition comprising: (a) an effective amount of a moisture absorbing material; and (b) a functional additive; and (ii) instructions for combining the spoilage reducing composition with bird feed.

One embodiment of the present invention provides a kit comprising: (i) a spoilage reducing composition comprising: (a) an effective amount of a moisture absorbing material; (b) a support material; and (c) a functional additive; and (ii) instructions for combining the spoilage reducing composition with bird feed.

One embodiment of the present invention provides a kit comprising: (i) a spoilage reducing composition comprising an effective amount of a moisture absorbing material; (ii) feed; and (iii) instructions for combining the spoilage reducing composition with bird feed.

One embodiment of the present invention provides a kit comprising: (i) a spoilage reducing composition comprising: (a) an effective amount of a moisture absorbing material; and (b) a support material; (ii) feed; and (iii) instructions for combining the spoilage reducing composition with bird feed.

One embodiment of the present invention provides a kit comprising: (i) a spoilage reducing composition comprising: (a) an effective amount of a moisture absorbing material; and (b) a functional additive; (ii) feed; and (iii) instructions for combining the spoilage reducing composition with bird feed.

One embodiment of the present invention provides a kit comprising: (i) a spoilage reducing composition comprising: (a) an effective amount of a moisture absorbing material; (b)

a support material; and (c) a functional additive; (ii) feed; and (iii) instructions for combining the spoilage reducing composition with bird feed.

One embodiment of the present invention provides a kit for preventing spoilage of bird feed in a bird feeder, wherein the feed comprises a plurality of seed.

One embodiment of the present invention is a kit for preventing spoilage of feed in a bird feeder wherein the moisture absorbing material of the spoilage reducing composition comprises a silica gel.

One embodiment of the present invention is a kit for preventing spoilage of feed in a bird feeder wherein the moisture absorbing material of the spoilage reducing composition comprises silica in the form of silicon dioxide and/or hydrated silicon dioxide.

One embodiment of the present invention is a kit for preventing spoilage of feed in a bird feeder wherein the moisture absorbing material of the spoilage reducing composition comprises silica selected from the group consisting of silica gel, precipitated silica, amorphous silica, colloidal silica, pyrogenic silica, fumed silica, silica aerogel, and mixtures thereof.

One embodiment of the present invention is a kit for preventing spoilage of feed in a bird feeder wherein the moisture absorbing material of the spoilage reducing composition comprises an alumina, aluminum oxide and/or hydrated aluminum oxide.

One embodiment of the present invention is a kit for preventing spoilage of feed in a bird feeder wherein the moisture absorbing material of the spoilage reducing composition comprises an alumina selected from the group consisting of amorphous alumina, activated alumina, activated bauxite, gibbsite, bauxite, boehmite, pseudoboehmite, and mixtures thereof.

One embodiment of the present invention is a kit for preventing spoilage of feed in a bird feeder wherein the moisture absorbing material of the spoilage reducing composition comprises an absorbent mineral selected from the group consisting of natural zeolite, synthetic zeolite, perlite, expanded perlite, volcanic ash, pumice, tobermite, tuff, attapulgite, sepiolite, montmorillonite, smectite, bentonite, kaolinite, halloysite, hectorite, dicalcium silicate, clay, activated clay, Fuller's earth, vermicullite, gypsum, shale, bassanite, diatomaceous earth, diatomite, and mixtures thereof.

One embodiment of the present invention is a kit for preventing spoilage of feed in a bird feeder wherein the moisture absorbing material of the spoilage reducing composition comprises a nanomaterial selected from the group consisting of silica, hydrated silica, alumina, hydrated alumina, titania, and mixtures thereof.

One embodiment of the present invention is a kit for preventing spoilage of feed in a bird feeder wherein the moisture absorbing material of the spoilage reducing composition comprises a material capable of absorbing at least 30 percent by weight of water in the form of liquid water, water vapor, and combinations thereof.

One embodiment of the present invention is a kit for preventing spoilage of feed in a bird feeder wherein the support material of the spoilage reducing composition is selected from the group consisting of plaster of paris, paper, cellulosic webs, polymeric fibrous webs, glass, plastic, wood, metal, minerals, ceramic, wood chips, alfalfa, bark, straw, synthetic foams, recycled materials, grain, seed, sand, agricultural by-products, corn cobs, nut shells, activated carbon, absorbent polymers, polyacrylamide, modified starch, modified cellulose, and mixtures thereof.

One embodiment of the present invention is a kit for preventing spoilage of feed in a bird feeder wherein the functional additive of the spoilage reducing composition is selected from the group consisting of moisture indicating agents, anti-microbial agents, anti-molding agents, colorants, odor absorbers, feed spoilage indicators, and mixtures thereof.

One embodiment of the present invention is a kit for preventing spoilage of feed in a bird feeder wherein the spoilage reducing composition occurs in packets or porous containers to be placed in the bird feeder.

One embodiment of the present invention is a kit for preventing spoilage of feed in a bird feeder wherein the spoilage reducing composition occurs in porous or semi-porous containers in the shape of a rod, tube, cylinder, cube, prism pyramid, disk, donut, ovoid, and combinations thereof, to be placed in the feeder along with the feed.

One embodiment of the present invention is a kit for preventing spoilage of feed in a bird feeder wherein the spoilage reducing composition comprises a shaped body, wherein said shaped body comprises a form selected from the group consisting of a powder, granule, crystal, solid, gel, foam, disk, cube, cylinder, rod, ovoid, torus, sphere, donut, pyramid, prism, and combinations thereof.

One embodiment of the present invention is a kit for preventing spoilage of feed in a bird feeder wherein the spoilage reducing composition comprises a shaped body, wherein said shaped body is of a size equal to or smaller than the size of said feed.

One embodiment of the present invention is a kit for preventing spoilage of feed in a bird feeder wherein the outer packaging material contains a spoilage reducing composition.

One embodiment of the present invention is a kit for preventing spoilage of feed in a bird feeder wherein the outer packaging material contains a spoilage reducing composition, and the outer packaging material comprises a reversibly sealable packaging means, wherein said packaging means is not permeable to water, water vapor, and combinations thereof.

One embodiment of the present invention is a kit for preventing spoilage of feed in a bird feeder wherein the outer packaging material contains a spoilage reducing composition and the outer packaging material comprises a water-permeable packaging means, wherein said packaging means is permeable to water, water vapor, and combinations thereof.

One embodiment of the present invention is a kit for preventing spoilage of feed in a bird feeder wherein the outer packaging material contains a spoilage reducing composition, and the outer packaging material comprises a water-permeable packaging means, wherein said packaging means is permeable to water, water vapor, and combinations thereof, and the spoilage reducing composition is incorporated as part of the feeder.

One embodiment of the present invention is a kit for preventing spoilage of feed in a bird feeder wherein the moisture absorbing material of the spoilage reducing composition comprises silica selected from the group consisting of silica gel, precipitated silica, amorphous silica, colloidal silica, pyrogenic silica, fumed silica, silica aerogel, and mixtures thereof, and said the silica comprises a shaped body, wherein said shaped body is of a size between 0.001 millimeters to about 1 meter.

One embodiment of the present invention is a kit for preventing spoilage of feed in a bird feeder wherein the instructions comprise the step of adding said spoilage reducing composition to said feeder in an effective amount prior to addition of said bird feed.

One embodiment of the present invention is a kit for preventing spoilage of feed in a bird feeder wherein the instructions comprise the step of adding said spoilage reducing composition simultaneously with said bird feed to said feeder.

One embodiment of the present invention is a kit for preventing spoilage of feed in a bird feeder wherein the instructions comprise the step of adding said spoiling reducing composition to said feeder in an effective amount following addition of said bird feed.

One embodiment of the present invention is a kit for preventing spoilage of feed in a bird feeder wherein the instructions comprise the step of mixing said spoilage reducing composition with bird feed prior to addition to the bird feeder.

One embodiment of the present invention is a kit for preventing spoilage of feed in a bird feeder wherein the instructions comprise any combination of the steps selected from the group consisting of (1) adding said spoilage reducing composition to said feeder in an effective amount prior to addition of said bird feed, (2) adding said spoilage reducing composition simultaneously with said bird feed to said feeder, (3) adding said spoiling reducing composition to said feeder in an effective amount following addition of said bird feed, (4), mixing said spoilage reducing composition with bird feed prior to addition to bird feed.

One embodiment of the present invention is a kit for preventing spoilage of feed in a bird feeder wherein the effective amount of the spoilage reducing composition is between about 0.05 weight percent to 50 weight percent of the weight of the bird feed present in the feeder.

DETAILED DESCRIPTION

Before describing the present invention in detail, it is to be understood that this invention is not limited to particularly exemplified formulas or ingredients as such may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

It must be noted that, as used in this specification and the appended claims, the singular forms "a," "an" and "the" include plural referents unless the content clearly dictates otherwise. Thus, for example, reference to a "indicating agent" includes two or more such agents.

Bird Feed

Bird feed compositions can include any mixture of materials commonly ingested by wild, domestic, or agricultural birds. Those practiced in the art recognize that these generally include seeds, grains, nuts, legumes and/or fruit, but can also include plant vegetative matter, leaves, flowers, salts, lard, fat, oils, suet, minerals and mixtures thereof. Feed can include agglomerated particles containing mixtures of feed materials. Feed can include hulled and/or unhulled seeds, grains, nuts, or legumes. Feed can also include whole and/or broken pieces of seeds, grains, nuts, legumes, and/or fruit.

Bird Feeder

One of numerous devices designed to dispense or display bird feed for the purpose of giving access of the feed to birds. Examples of which are tube feeders, hopper feeders, silo feeders, bin feeders, and tray feeders. These have in common the ability to hold feed, with some kind of opening that allows birds to have access to the feed.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

Spoilage Reducing Compositions

The spoilage reducing compositions of the present invention comprise: (a) an effective amount of a moisture absorbing material; (b) optionally, a support material; (c) optionally, a functional additive; and (d) optional adjuncts.

In one embodiment of the invention, the spoilage reducing compositions are in the form of granules having a mean particle size of between 1 mm and 8 mm. In another embodiment of the present invention, the mean particle size of the granules is in the range of approximately 2 mm to 8 mm. In another embodiment of the present invention, the mean particle size of the granules is in the range of approximately 1 mm to 2 mm. This size is small enough to distribute well in the feed and to flow through most bird feeders, but large enough that the bird can discriminate the particles as separate from the feed and avoid ingesting them. Particle size of the inventive composition can actually be any size and any particle size distribution which can be accommodated by the feeder, including sizes wherein the mean particle size is between about 1 micron and about 10 cm.

One embodiment of the spoilage reducing composition is agglomerated particles or pellets containing a mixture of a) moisture absorbing material, b) optionally, support material, c) optionally, functional additives, and d) optionally, feed components.

One embodiment of the spoilage reducing composition is a mixture of materials adhered together into a shape with binding agents, consisting of a) moisture absorbing material, b) optionally, support material, c) optionally, functional additives, and d) optionally, feed components.

The spoilage reducing compositions may also be in shaped form, such as a geometric shape, which may be placed into the feeder to absorb moisture. The spoilage reducing compositions may be formed as large single shaped body, or could be in the form of a plurality of smaller shaped bodies, for example powdered or granular forms, or pressed together to form complex shaped bodies, such as, for example, in the shape of a cylinder. If necessary, an optional binding agent could be used to bridge particles and form a physically enduring shape. The size of the shaped body can be whatever size is accommodated by the feeder, including sizes between 0.001 millimeter to 1 meter.

An effective amount of the spoilage reducing composition is that amount of material, or greater, that is needed to have any noticeable effect on the reduction of spoiling in a bird feeder. Testing shows that even 2 weight percent of the spoilage reducing composition can have significant effects on the reduction of spoilage, and it is anticipated that the effective level is much less than that amount.

Moisture Absorbing Material

Suitable moisture absorbing materials include those materials having the ability to absorb at least about 30% by weight in liquid water and/or water vapor. That is to say, 30 grams of liquid water and/or water vapor per 100 grams of the moisture absorbing material prior to absorbing said water. Various materials may be used as long as they have the ability to strongly sequester liquid water or water vapor.

In one class of suitable moisture absorbing material, the ability to sequester water or water vapor is due to the extremely small pore sizes in the structure of the materials. The materials can have average pore sizes in the range from about 5 angstroms to about 1000 angstroms. The materials may also have average pore sizes in the range from 50 to about 250 angstroms.

In another class of moisture absorbing material, the ability to sequester water or water vapor is due to the ability of the chemical structure to swell and accommodate water into its structure.

The moisture absorbing material can be inorganic absorbent materials such as sepiolite, natural zeolite, synthetic zeolite, shale, pumice, tuff, tobermite, attapulgite, bentonite, kaolinite, halloysite, montmorillonite, smectite, hectorite, dicalcium silicate, clay, activated clay, vermiculite, diatomaceous earth, diatomite, Fuller's earth, fossilized plant materials, perlite, expanded perlite, volcanic ash, plaster of paris (bassanite), gypsum, shale, dicalcium silicate, similar minerals, and mixtures thereof.

The moisture absorbing material can be silica-based absorbent such as silica gel, precipitated silica, amorphous silica, colloidal silica, pyrogenic silica, fumed silica, silica aerogel, and mixtures thereof. The moisture absorbing material can be an alumina-based absorbent such as amorphous alumina, activated alumina, activated bauxite, gibbsite, bauxite, boehmite, pseudoboehmite, and mixtures thereof.

In one embodiment of the invention, the moisture absorbing material is silica gel. Silica gel is formed by reaction of acid and sodium silicate, followed by aging and drying. This material is also referred to as amorphous silica, silica acid or hydrated silica. As will be appreciated by one having ordinary skill in the art, typical silica gel material of "Type C" has a bulk density of 400-600 g/L an average pore size in the range of 50-250 angstroms and an absorption capacity of approximately 50%-100%. However, other types of silica gel can also be used which have average bulk densities between 10-2000 g/L and average pore sizes between 5-1000 angstroms. Ultra small pore size "Type A" and "Type B" silica gels can be used as well as the mesoporous "Type MA" and "Type MB" materials. These silica materials are usually white to semi-translucent and may be either powdered, granular or bead shaped.

In another embodiment of the invention, the absorbent silica material is a hydrophilic silica gel, precipitated silica, colloidal silica, pyrogenic silica, fumed silica, or silica aerogel. Hydrophobic silica materials have the ability to improve flowability and reduce caking, but are not recommended as moisture absorbing materials.

The moisture absorbing material may also be in granular or powdered form which is placed in porous packets or containers to be placed in the bird feeder to absorb moisture.

Support Material

Suitable support materials include, but are not limited to, organic materials such as plaster of paris, paper, cellulosic webs, polymeric fibrous webs, glass, plastic, wood, metal, minerals, ceramic, wood chips, alfalfa, bark, straw, sand, grain hulls, synthetic foams, corn cobs, nut shells, activated carbon, grain, seed, recycled materials, and pelletized absorbing litter materials. Further examples of suitable support materials include, but are not limited to, absorbent polymers such as polyacrylamide, modified starch, modified cellulose and the like. The support material generally serves, when employed in the inventive compositions, as a matrix to hold and/or support the moisture absorbing materials and other functional materials. The support material may be present in any desirable weight percent with respect to the spoilage reducing composition.

Functional Materials

Functional materials that may further be combined with the present inventive compositions include anti-microbial agents, anti-molding agents, moisture indicating agents, coloring agents and binding agents. Additional functional materials include, but are not limited to odor absorbers, feed spoilage indicators, and the like. The functional materials may be present in any desirable weight percent with respect to the spoilage reducing composition. In general, the functional materials are generally employed at an effective level, such level being sufficient with respect to the spoilage reducing composition, to adequately perform their function.

Anti-microbial Agent

As indicated above, the spoilage reducing compositions of the present invention can further include an anti-microbial and/or an anti-molding agent. Numerous anti-microbial and anti-molding agents are available for use (e.g. Myacide, boric acid, and Dowcil™).

Moisture Indicating Agents

Moisture indicating agents include those materials that change appearance or color when humid, wet, or exposed to moisture. These agents can be added to the spoilage reducing composition of the present invention to indicate when moisture has been absorbed, thereby acting as a visual or apparent indicator of the moisture absorbing process. The moisture indicating agents may also serve as an indicator to prompt replacing of the spoilage reducing composition in use. Suitable moisture absorbing materials include, but are not limited to, cobalt chloride and phenolphthalein, and other know materials common to the art which change color in the presence of moisture.

Coloring Agent

A coloring agent may also be added to enhance the aesthetic nature of the spoilage reducing composition, and to make it easier to see the distribution of the inventive composition, and/or to hide any negative discoloration of the inventive composition during use. Coloring agents include, but are not limited to, dyes, pigments, and polymeric colorants. In general, suitable coloring agents include those that do not substantially eliminate the moisture absorbing nature of the spoilage reducing composition of the present invention. Non-limited examples of dyes include acid blue 9 dye, methylene blue, and wool violet. Examples of pigment are hematite, Cu-phthalocyanine or Ultramarine blue. Examples of polymeric colorants are various products under the Liquitint™ name produced by Milliken Chemical.

Binding Agent

Binding agents include, but are not limited to, any class of polymeric materials, such as natural gums, modified gums, natural starches, modified starches, modified cellulose, acrylic polymers, polyvinyl alcohols, silicates, and mixtures thereof. Binding agents also include, but are not limited to, glue, adhesive, tackifiers, oils, lard, fat, suet, sugars, flour, molasses, gelatin, protein, albumin, mucilage, lignin, clay, bentonite, and other materials capable of holding the various materials, additives, agents and ingredients of the present inventive compositions together in the form of a shaped body as described herein.

Packaging Means

Suitable impermeable packaging means include, for example, but are not limited to containers of glass, plastic, waxed paper, and other materials known in the art for storing and dispensing moisture and water sensitive materials. Other suitable impermeable packaging means include but are not limited to containers or film composed of polyvinylchloride (PVC), cellulose, cellophane, thermoplastics, silicones, polyethylene, or polypropylene.

Suitable permeable packaging mean, include, for example, but are not limited to constructs of mesh, fabric, screen, paper, perforated plastic or polymer containers, and other constructs known in the art for storing materials and yet providing for at least some degree of permeability to water, water vapor, and combinations thereof. Other suitable permeable packaging means include bags composed of porous material, perforated rigid containers, perforated bags made of impermeable materials, perforated flexible film, perforated bags, and semi-permeable film, permeable film coatings, or perforated impermeable film coatings.

EXAMPLES

The following examples illustrate suitable embodiments of the spoilage reducing compositions of the present invention and methods of use of the compositions in combination with a bird feeder. The examples are for illustrative purposes only and are not meant to limit the scope of the invention in any way.

Test 1

The first set of examples describe embodiments of spoilage reducing compositions comprising a silica gel and bird feed blend dry mixed at several ratios and employed in a manner as indicated in Table 1. A range of silica gel and bird feed product ratios were prepared and tested to determine the ability of the additive to trap moisture and inhibit the formation of mold in a feeder. Table 1 shows the effect of adding 0% to 10% of silica gel to nyjer thistle bird feed. The formulas were made by adding increasing amounts of 1-2 mm silica gel to nyjer thistle seed as shown in Table 1 and mixing. The compositions were placed in a transparent plastic tube 6½ inches long by 1¼ wide and sealed at the bottom. This container represents the form of a typical tube feeder for thistle seed. As a torture test, 5 grams of water (representing rain or a leak) were added to the top of the test feeder on the first, and fourth days of the test. The test feeders were then inspected each day and rated on a scale of 0 to 10, with 0 being mold free and 10 being abundant mold. After 1 week, the samples without silica gel started to mold, while the several samples containing silica gel were mold-free. After 3 weeks, the samples without silica gel were extremely contaminated with mold on the bottom of the container, while the samples with silica gel were essentially free of mold.

TABLE 1

| Example # | % Silica Gel | % Thistle Seed | Mold Level Results 1 week | Mold Level Results 3 weeks |
|---|---|---|---|---|
| Control A | 0% | 100% | 4 | 10 (abundant mold) |
| Control B | 0% | 100% | 4 | 10 |
| 1 | 2% | 98% | 0 | 5 |
| 2 | 2% | 98% | 1 | 6 |
| 3 | 5% | 95% | 0 | 2 |
| 4 | 5% | 95% | 0 | 2 |

TABLE 1-continued

| Example # | % Silica Gel | % Thistle Seed | Mold Level Results 1 week | Mold Level Results 3 weeks |
|---|---|---|---|---|
| 5 | 10% | 90% | 0 | 1 |
| 6 | 10% | 90% | 0 | 1 (essentially mold free) |

Test 2

The second set of examples describe embodiments of spoilage reducing compositions comprising a 100% Silica Gel product used as an additive to eliminate feed spoilage in a manner as indicated in Table 2. Table 2 shows the effect of adding 0% to 10% silica gel in different feeder distributions into white millet bird feed. The formulas were made by adding increasing amounts of 1-2 mm silica gel to white millet seed as shown in Table 2. As shown on the chart, the silica gels in some samples were blended with seed, and the silica gels in some samples were placed at the bottom of the feeder. As in Test 1, the compositions were placed in a transparent plastic tube 6½ inches long by 1¼ wide and sealed at the bottom. This container represents the form of a typical tube feeder for thistle seed. As a realistic test, 2 grams of water (representing rain or a leak) were added to the top of the test feeder on the first, fourth, eleventh, and nineteenth day of the test. The test feeders were then inspected each day and rated on a scale of 0 to 10, with 0 being mold free and 10 being abundant mold. As Table 2 shows, the results are much better if the silica gel moisture absorbing material in placed at the bottom of the feeder, rather than just mixed in the seed. This is because any added water quickly travels to the bottom of the feeder.

TABLE 2

| Sample # | Location of Silica Gel | % Silica Gel | % Millet Seed | Mold Level Results |
|---|---|---|---|---|
| Control C | — | 0% | 100% | 10 (abundant mold) |
| Control D | — | 0% | 100% | 10 |
| 7 | Blended with Seed | 2% | 98% | 3 |
| 8 | Blended with Seed | 2% | 98% | 3 |
| 9 | Blended with Seed | 5% | 95% | 1 |
| 10 | Blended with Seed | 5% | 95% | 1 |
| 11 | Blended with Seed | 10% | 90% | 0 |
| 12 | Blended with Seed | 10% | 90% | 0 |
| 13 | Bottom of Tube | 2% | 98% | 2 |
| 14 | Bottom of Tube | 2% | 98% | 2 |
| 15 | Bottom of Tube | 5% | 95% | 0 |
| 16 | Bottom of Tube | 5% | 95% | 0 |
| 17 | Bottom of Tube | 10% | 90% | 0 |
| 18 | Bottom of Tube | 10% | 90% | 0 (mold free) |

Example 19

50% Silica Gel (Type C), 1-2 mm size
25% Natural Zeolite, 1-2 mm size
25% Polyacrylimide absorbing polymer, 1-2 mm size

Example 20

75% Activated Alumina, granular 10×20 mesh
5% Granular Activated Carbon, 20×40 mesh
20% Perlite, 10×20 mesh Example 20 was prepared by dry mixing the individual ingredients to form a mixed granular composition.

Example 21

75% Activated Alumina, granular 10×20 mesh
5% Granular Activated Carbon, 20×40 mesh
20% Perlite, 10×20 mesh Example 21 was prepared by dry mixing the individual ingredients to form a mixed granular composition.

Example 22

1% sodium silicate solution (33% active solution)
99% Silica gel (Type B), 2-4 mm Preparation of Example 22 was as follows: Sodium silicate solution is applied to the silica gel, and the mixture is pressed together to form cylinders and then dried. Cylinders are placed in tube feeders or other feeders as a moisture absorbing material.

I claim:

1. A kit for preventing spoilage of bird feed in a bird feeder comprising:
   (i) a spoilage reducing bird feed additive composition comprising:
      (a) a moisture absorbing material selected from the group consisting of natural zeolite, synthetic zeolite, perlite, expanded perlite, volcanic ash, pumice, tobermite, tuft, attapulgite, sepiolite, montmorillonite, smectite, bentonite, kaolinite, halloysite, hectorite, dicalcium silicate, clay, activated clay, Fuller's earth, vermicullite, gypsum, shale, bassanite, diatomaceous earth, diatomite, and mixtures thereof; and
   (ii) instruction means for dry mixing said spoilage reducing bird feed additive composition with a bird feed thereby reducing spoilage of the bird feed in a bird feeder.

2. The kit of claim 1, further comprising bird feed comprising a plurality of bird seed.

3. The kit of claim 1, wherein said spoilage reducing bird feed additive composition further comprises a support material selected from the group consisting of plaster of paris, paper, cellulosic webs, polymeric fibrous webs, glass, plastic, wood, metal, minerals, ceramic, wood chips, alfalfa, bark, straw, synthetic foams, recycled materials, agricultural by-products, corn cobs, nut shells, activated carbon, absorbent polymers, polyacrylamide, modified starch, modified cellulose, and mixtures thereof.

4. The kit of claim 1, wherein said spoilage reducing bird feed additive composition further comprises a functional additive selected from the group consisting of moisture indicating agents, anti-microbial agents, anti-molding agents, colorants, odor absorbers, feed spoilage indicators, and mixtures thereof.

5. The kit of claim 1, wherein said instruction means comprise the steps selected from the group consisting of (1) the step of adding said spoilage reducing feed additive composition to said bird feeder prior to addition of said bird feed, (2) the step of adding said spoilage reducing feed additive composition simultaneously with said bird feed, (4) the step of mixing said spoilage reducing feed additive composition with bird feed prior to addition to the bird feeder, and combinations thereof, feed to said bird feeder, (3) the step of adding said spoiling reducing feed additive composition to said bird feeder following addition of said.

6. The kit of claim 1 wherein the amount of said spoilage reducing feed additive composition is between about 0.05 weight percent to 50 weight percent of the weight of bird feed present in the feeder.

7. A kit for preventing spoilage of bird feed in a bird feeder comprising:
   (i) a spoilage reducing bird feed additive comprising,
      (a) a moisture absorbing material; and
      (b) a support material selected from the group consisting of plaster of paris, paper, cellulosic webs, polymeric fibrous webs, glass, plastic, wood, metal, minerals, ceramic, wood chips, alfalfa, bark, straw, synthetic foams, recycled materials, agricultural by-products, corn cobs, nut shells, activated carbon, absorbent polymers, polyacrylamide, modified starch, modified cellulose, and mixtures thereof, and
   (ii) instruction means for dry mixing the spoilage reducing bird feed additive with a bird feed in order to reduce spoilage of the bird feed in a bird feeder.

* * * * *